United States Patent Office 3,453,589
Patented July 1, 1969

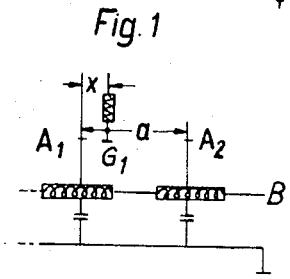
Fig.1
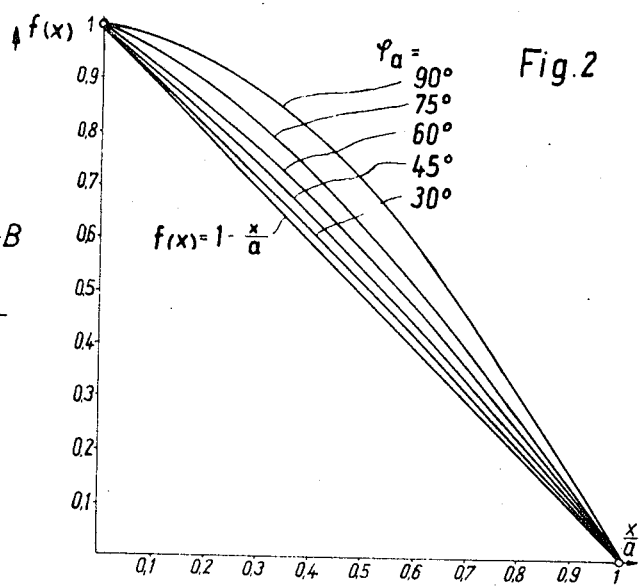
Fig.2
Fig.3
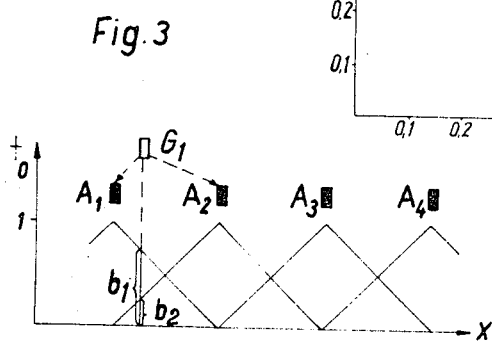
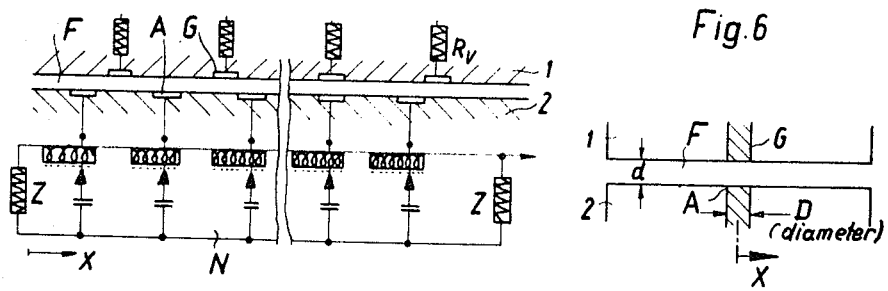
Fig.5
Fig.6
Fig.7
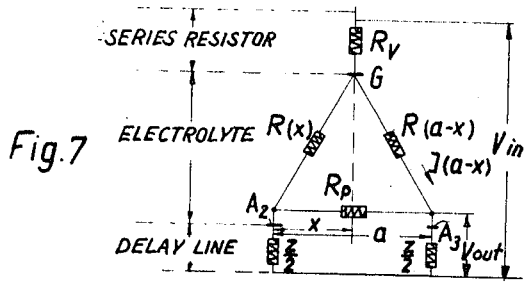
Inventors:
Gerd Hemmie
Egidius Arens
BY Spencer & Kaye
Attorneys

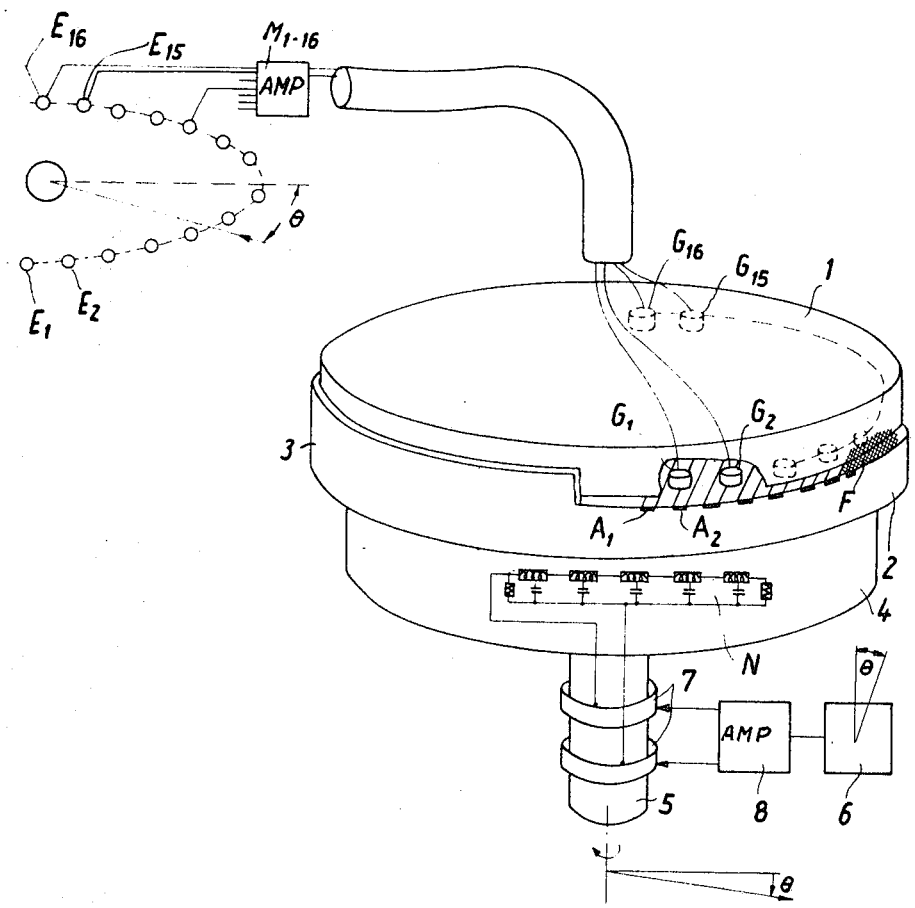

---

3,453,589
APPARATUS FOR MEASURING THE DIRECTION OF INCIDENT WAVES
Gerd Hemmie, Bremen, and Egidius Arens, Papenburg, Germany, assignors to Fried. Krupp Gesellschaft mit beschrankter Haftung, Essen, Germany
Filed Jan. 23, 1968, Ser. No. 699,869
Claims priority, application Germany, Jan. 25, 1967, B 90,916
Int. Cl. H04b 13/02; G01s 3/80
U.S. Cl. 340—6                                19 Claims

---

ABSTRACT OF THE DISCLOSURE

Apparatus for measuring the direction of propagation of waves, such as sound waves in water. The apparatus includes a group of receivers for detecting the waves and a compensator, connected thereto, for equalizing the differences in transit time of the plane fronts of the waves incident on the individual receivers. The compensator includes a delay line and a switching network connecting the group of receivers with the delay line. The switching network comprises, more particularly, a group of sender switch elements connected with the individual receivers; a group of receiver switch elements connected to various points on the delay line and conductive fluid means, coupling each one of the sender switch elements to at least two receiver switch elements, for interpolating the angle of incidence of the waves between the discrete angles which would be measured were each of the sender switch elements connected to only one of the receiver switch elements.

---

Background of the invention

The present invention relates to apparatus for measuring the direction of propagation of waves, such as sound waves in water, by means of a geometrically arranged group of wave receivers and a compensating device connected thereto which has a delay network for equalizing the differences in transit time of the plane wave fronts incident on the various receivers.

Apparatus of the type described above for measuring the direction of propagation of incident waves, generally includes a network of two interacting groups of switch elements; namely, a first group of sender elements, which are connected with the outputs of the receivers and form a geometric planar group conformal to the group of receivers and a planar group of receiver elements which are connected to various points of the delay network. The two switch element groups are thus so arranged and so adjustable with respect to each other that every switch network setting is related to a particular compensation of the plane wave transit time differences for a particular direction of propagation.

In apparatus of this type, which is known in the prior art, the sender elements and the receiver elements consist of planar groups of contacts which physically touch and can be moved relative to each other. The differences in transit time can therefore be varied in steps by causing the sender contacts to slide or ride over the receiver contacts to close the circuits. Because of limitations in space and in the cost of the delay network and because of certain difficulties which arise in the construction of the compensating device, it is not possible to make the switching steps of the switching network sufficiently small to allow for the quasi-continual adjustment of the compensation. A phase error of half the phase shift between two neighboring receiver contacts must be tolerated when the sender contacts are made to ride from one set receiver contacts to the next. Particularly when the frequencies are high and the number of receivers and/or sender contacts in service is not so large, the direction-finding accuracy of the sonar system will thus be limited to an undesirable degree.

There exists an additional disadvantage in this type of prior art switching network; namely, that the friction between the switch contacts will cause them to wear during use. Electrical leakage or other electrical disturbances may therefore result if the contacts are not replaced from time to time.

Summary of the invention

An object of the present invention, therefore, is to design apparatus for measuring the direction of propagation of incident waves, which apparatus does not partake of the disadvantages noted above.

More particularly an object of the present invention is to design apparatus of the type described above which is exceedingly compact, may be manufactured at small cost, provides continuous adjustability in compensation and a high degree of direction-finding accuracy, and combines high reliability with a long serviceable life.

These and other objects which will become apparent in the discussion that follows are achieved, according to the present invention, by constructing the groups of switch elements of the compensating device in such a way that each sender switch element is simultaneously coupled with a number of adjoining receiver switch elements and that the degree of coupling is continuously dependent on the geometric relative position of the sender and the receiver switch elements. This construction, as will be explained in detail below, effects an interpolation between the angles of incidence of the waves on the wave receivers which would be measured were each of the sender switch elements connected to only a single one of the receiver switch elements.

In theory, any type of known coupling may be employed between respective neighboring sender and receiver switch elements: the common capacitive coupling may be effective, for example, if an electric transmission field is established between the two groups of switch elements. Because of the low (audio range) frequencies used in a sonar system, it may be preferable to employ another type of coupling; however, any such coupling, like the capacitive coupling, advantageously operates without requiring the physical contact of the switch elements. The interference producing wear effects, caused by friction between the sender and receiver switch elements may be thereby eliminated.

In an especially advantageous embodiment of the present invention the switch elements of the switching network are realized with electrical contacts which are coupled by means of a conductive fluid. The specific resistance of the fluid is made sufficiently high so that the resistance between two adjoining contacts fails to appreciably affect the impedance between the points of the delay line to which the contacts are coupled.

At least the surface portions of the contacts which are wetted by the conductive fluid are preferably made of a noble or precious metal. An electrolytic solution may be used as the conductive fluid: a solution in the form of a mixture of mannite, boric acid and potassium chloride with a diluting agent, such as water, has proven especially serviceable for this purpose. An alcohol additive may also be introduced into the solution to guard against freezing.

The electrolytic coupling just described is especially suitable for waves in the low and medium frequency range. It is more advantageous, on the other hand, to effect the coupling of the switch contacts by means of a dielectric, such as air, in the frequency range above one hundred kilohertz.

When the receivers are arranged in the form of a circle, or arc of a circle, both constructional and operational advantages are obtained if the sender and the receiver contacts are arranged on cylindrical surfaces one of which concentrically surrounds the other.

And in order to avoid the use of sliding contacts entirely, the movable contact group may be connected to its respective stationary circuit elements by means of the electrolytic fluid coupled through additional auxiliary contacts.

*Brief description of the drawing*

FIGURE 1 is a schematic diagram of a section of a switch element arrangement which will serve as the basis for a general discussion of the interpolative sensing according to the present invention.

FIGURE 2 is a graph of the interpolation curves for the arrangement according to FIGURE 1.

FIGURE 3 is a schematic diagram illustrating the interpolative sensing according to the present invention.

FIGURE 4 is a schematic diagram of a sonar receiver according to the present invention having electrolytic coupling between the switch elements of the compensating device.

FIGURE 5 is a developed diagram partly schematic and partly in cross section of a portion of a compensating device according to FIGURE 4.

FIGURE 6 is a diagram of two switch elements of the compensating device according to FIGURE 4 which are shown as a basis for an analysis of the coupling between them.

FIGURE 7 is an electrical equivalent circuit diagram of an interpolation element in the compensating device according to FIGURE 4.

*Description of the preferred embodiment*

Figure 8:
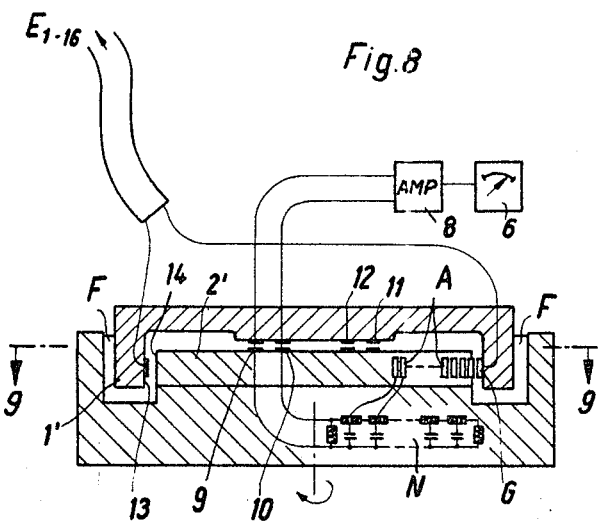
FIGURE 8 is a cross-sectional diagram similar to FIGURE 5 taken through a modified embodiment of the compensating device according to the present invention.

To provide a basic understanding of the operation of the interpolative sensing apparatus according to the present invention, a general analysis concerning the origin of the interpolation function that occurs with interpolative sensing will not be described in connection with FIGURES 1, 2 and 3. The remaining discussion will then be directed to a description of the exemplary embodiments as illustrated in FIGURES 4 through 9.

The usual prior art compensator which has contact groups in physical contact with each other produces a phase angle shift at the output of the delay network when a sender contact is moved between two neighboring receiver contacts. This phase shift is undesirable and can only be sufficiently reduced by increasing the number of receiver contacts and the number of delay elements in the delay network. This difficulty is overcome according to the present invention by providing that the voltage of a sender contact $G_1$ which lies between two receiver contacts $A_1$ and $A_2$, as shown in FIGURE 1, is simultaneously fed to the two output contacts in differing amounts according to a certain spatially dependent function. The geometric sum of these components, appearing at the output B of the delay network, will thus correspond phasewise to the exact position of the input contact $G_1$. The amplitude should, in addition, remain unchanged.

Given that the voltage of the input contact $G_1$ is at amplitude "1"; the spatially dependent phase as $\phi_x$; the phases at the output contacts $A_1$ and $A_2$ are $\phi_1$ and $\phi_2$, respectively, so that $(\phi_1-\phi_2)$ corresponds to the transit time $\tau$ between two points of the delay network; the interpolation function $f(x)$ will be given by:

$$e^{j\phi_x}=f(x)\cdot e^{j\phi_1}+f(a-x)\cdot e^{j\phi_2}$$

Setting $$\theta_x=\theta_1+\frac{x}{a}(\phi_2-\phi_1)$$

$\phi_2-\phi_1=2\pi f\tau$; and $\phi_1=0$ this equation becomes $$e^{j\frac{x}{a}2\pi f\tau}=f(x)+f(a-x)\cdot e^{j2\pi f\tau}$$

Separating the real and imaginary parts, there is obtained:

$$\cos\frac{x}{a}2\pi f\tau=f(x)+f(a-x)\cdot\cos 2\pi f\tau$$

$$\sin\frac{x}{a}2\pi f\tau=f(a-x)\cdot\sin 2\pi f\tau$$

By transposing these equations and solving for $f(x)$, there results the interpolation function $$f(x)-\cos\frac{x}{a}\cdot 2\pi f\tau=\frac{\sin\frac{x}{a}2\pi f\tau}{-\sin 2\pi f\tau}\cdot\cos 2\pi f\tau \quad (1)$$

The function $f(x)$ is frequency-dependent. The characteristic of frequency dependence is of interest since the determination of the direction of a sound wave in water is accomplished in sonar systems with broad bands of frequencies. It is of advantage, on the other hand, that a single interpolation curve suffices.

The transit or propagation time in the delay line network is practically constant within the frequency range of interest. The phase $\phi_a$ between two neighboring receiver contacts of separation $a$ therefore increases in proportion to the frequency. Equation 1 thus becomes $$f(x)=\cos\frac{x}{a}\phi_a-\cot\phi_a\cdot\sin\frac{x}{a}\cdot\phi_a \quad (2)$$

In salt water where the speed of sound is 1470 m./s.:

$$\phi_a[°]=2.45\cdot a[\text{cm.}]\cdot f[\text{kHz.}] \quad (3)$$

In order to obtain an idea of the order of magnitude of $\phi_a$ let is be assumed that the receivers, which are brought into play to determine the direction of wave propagation, are arranged around a 120° arc of a circle having a diameter of 3 m. The total sound path length which must be compensated will thus be equal to 75 cm. If a noninterpolating compensator is employed and a 1% compensation accuracy is desired with an upper operating frequency limit of 10 kHz., the step length of a delay element must, in the most unfavorable case, be made equal to only 3 mm. A total of 250 receiver contacts and 250 delay line elements (with "split beam":500 delay line elements) would be thus required. If this number be reduced from 250 to, say, 37 elements, each with 2 cm. of equivalent water travel, the possible error is increased from 1% to 6.6%. This increased error can now be eliminated through the interpolation according to Equation 2. The phase angle between two neighboring receiver contacts may be calculated from Equation 3 to be $\phi_a=49°$.

The associated interpolation curve may be easily determined from the graph of FIGURE 2. The influence of frequency can also be recognized at once. For the example described above, where $a=2$ cm., $f=10$ kHz. and $\phi_a=49°$, the entire frequency range between 0 Hz. and 10 kHz. may be compensated out sufficiently well with a simplified frequency-independent interpolation function $$f(x)=1-x/a \quad (4)$$

The equation is valid within the limits $x=0$ and $x=a$.

With a number of parallel receiver contacts $A_1$ to $A_4$, as shown in FIGURE 3, distribution curves will result which have a portion $a$ of the sender contact current flowing to the preceding receiver contact and a portion $b$ of the sender contact current flowing to the subsequent receiver contact.

FIGURE 4 illustrates a sonar system having a compensator provided with sensing apparatus having interpolation properties according to the principles set forth above. The interpolative effect is achieved with this compensator by the interposition of an electrolyte or other conducting fluid F between the sender contacts $G_1$ to $G_{16}$ and the receiver contacts $A_1$ to $A_n$. This fluid F thus provides the electrical connection between the contacts as a substitute for their physical contact with each other.

The system operates with a horseshoe-shaped group of receivers $E_1$ to $E_{16}$, which are connected through preamplifiers $M_1$ to $M_{16}$ with a corresponding horseshoe-shaped group of sender contacts $G_1$ to $G_{16}$. The sender contacts are mounted in a circular stationary base plate 1 in the electrical compensator.

The group of receiver contacts $A_1$ to $A_n$, which are connected to the delay network N, are arranged a short distance from the base plate; that is, from the sender contacts $G_1$ to $G_{16}$. The receiver contact group is located on the floor of a cup-shaped container, the edge 3 of which surrounds the base plate 1. This container serves to hold the conducting fluid F which couples the sender and receiver contacts. A casing 4 is rigidly attached to the bottom 2 of the container; this casing serves to enclose the delay network N.

To adjust the compensator and, in turn the direction-azimuth, the container 2, 3 with the receiver contact group $A_1$ to $A_n$, and the casing 4 with the network N, is made rotatable about its axis by means of a shaft 5. The delay network N is designed so that the angle of adjustment of the receiver contact group $A_1$ to $A_n$ with respect to the sender contact group $G_1$ through $G_{16}$ serves to compensate the transit time differences of the sound falling at a corresponding angle $\theta$ on the receivers $E_1$ to $E_{16}$. When the source of sound is at a direction azimuth $\theta$, therefore, the resulting voltage of the output of the compensator will be a maximum when the compensator is adjusted to this angle $\theta$. The maximum may be detected in an earphone, a meter, or other indicating device 6 connected to the output of the delay network N through sliding contacts 7 and a power amplifier 8.

Figure 9:
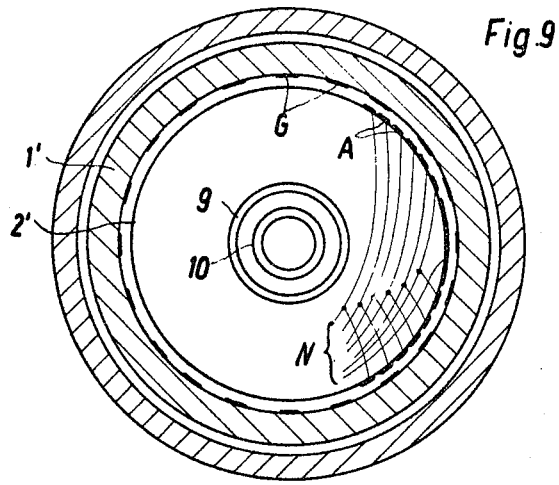
FIGURE 9 is a cross-sectional diagram taken along the line 9—9 of FIGURE 8.

Instead of bringing the resulting signal at the output of the delay line network N out through sliding contacts, it is also possible to avoid all friction contacts in the compensator by connecting the output through the electrolyte F as shown in FIGURES 8 and 9. The output of the network N is connected to two circular sender contacts 9 and 10 which rotate with the base of the container 2'. Circular receiver contacts 11 and 12, mounted a short distance above the contacts 9 and 10, receive the signal from the contacts 9 and 10 through the electrolyte F and transmit the same through the amplifier 8 to the indicator 6.

If the wave receivers are arranged in a circle or arc of a circle, the sender contacts G and receiver contacts A can be arranged on concentric cylindrical surfaces 13, 14 of the sender member 1' and receiver member 2', respectively, as illustrated in FIGURES 8 and 9.

Turning now to a discussion of FIGURES 5, 6 and 7, certain theoretical aspects of the effectiveness of the coupling between sender and receiver contacts by means of an electrolyte will now be considered.

The electrical resistance between two electrodes in an electrolyte is dependent both upon the conductivity of the fluid and the geometric proportions of the system. For the circular-shaped contacts G and A represented in FIGURES 5 and 6 this resistance is determined by $$R(x)_{x=0} = \rho \cdot \frac{4d}{\pi D^2}$$

where D is the diameter of the contacts, d the distance between them, and $\rho$ the resistivity of the fluid. If the contacts G and A are moved a distance $x$ with respect to each other in the direction shown, this resistance may be approximately given by the equation $$R(x) \cong \rho \frac{x}{D \cdot d} \quad (5)$$

where $x > D > d$.

The resistance increases, therefore, substantially linearly with the displacement of the electrodes along the $x$-axis.

Let it be assumed, for example, that the receiver contacts A of a compensator are separated from each other by a distance of 6 mm. Let it also be assumed that the sender and receiver contacts are identical electrodes having a circular surface with a diameter $D=3$ mm. and that they are separated by a gap of width $d=0.5$ mm. which is filled with an electrolyte. The increase in resistance at a relative displacement of $x=6$ mm. will therefore be approximately equal to $$\frac{R_{(x=6)}}{R_{(x=0)}} \cong 56.5 \sim 35 \text{ db}$$

This change in resistance may be used to advantage in an interpolating compensator.

An interpolation element of the compensator may be approximately described by the electrical equivalent circuit network shown in FIGURE 7.

The electrolyte resistance $R_p$ between two neighboring receiver contacts $A_2$ and $A_3$ is very much larger than the characteristic impedance Z of the delay network N; this resistance can therefore be ignored. The delay line output voltage $V_{out}$ which results from the partial current I $(a-x)$ is therefore $$V_{out} = V_{in} \frac{z}{2R(a-x)+z} \cdot$$

$$\frac{\left[R(x)+\frac{Z}{2}\right] \cdot \left[R(a-x)+\frac{Z}{2}\right]}{\left[R(x)+\frac{Z}{2}\right] \cdot \left[R(a-x)+\frac{Z}{2}\right] + RV[R(x)+R(a-x)+z]}$$

Given the condition $R_V \gg R(x) + R(a-x) \gg Z$ this equation simplifies to $$V_{out} = \frac{V_{in} \cdot Z}{2R_V} \cdot \frac{R(x)}{R(x)+R(a-x)} \quad (6)$$

Using Equation 5, wherein $R(x)$ varies linearly with the displacement, Equation 6 simplifies to $$V_{out} \cong V_{in} \cdot \text{const.} \frac{x}{r} \quad (7)$$

When $x=0$, that is, the sender contact G and receiver contact $A_2$ in FIGURE 7 are arranged opposite to each other, the output voltage $V_{out}$ resulting from the current I $(a-x)$ will be equal to 0. For $x=a$, that is, when the distance between G and $A_3$ is smallest, $V_{out}$ will be a maximum. The Equations 6 and 7 therefore fulfill the requirements of the interpolation equation $$f(x) = 1 - x/a$$

The sender and receiver contacts employed in the apparatus according to the present invention are preferably made of a precious metal. Experiments have shown that the ratio of the distance between the respective receiver contacts to the diameter of the sender contacts is best chosen to be in the order of magnitude of 2:3. The axail distance between the sender and receiver contacts is preferably kept small, that is, up to about 0.5 mm.

A copper sulphate solution may be employed as the electrolyte. An electrolytic solution which has proved especially advantageous consists of mannite, boric acid and potassium chlorite in water, a diluting medium, having an alcohol additive for depressing its freezing point.

The compensators according to the present invention effect a transit time compensation which is considerably improved over that of the known compensators having sliding contact groups. These compensators practically eliminate static, require no maintenance and may be easily realized in a device having small dimensions.

It will be understood that the above description of the present invention is subject to various modifications, changes and adaptations, and the same are intended to be comprehended within the meaning and range of equivalents of the appended claims. It is possible, for example, to employ other contact shapes, contact group configurations and other electrolytes than those specified in the preferred embodiments described above. It is possible also to utilize the present invention in compensators of other types, in particular, in compensators which operate in three dimensions.

We claim:
1. A device for measuring the direction of propagation of waves comprising, in combination:
   (a) a plurality of reeciver means arranged for detecting said waves;
   (b) a compensating delay line; and
   (c) switch means connecting said receiver means and said delay line comprising, in combination:
      (1) a plurality of switch sender contacts, each of said sender contacts being connected to one of said receiver means,
      (2) a plurality of switch receiver contacts, each of said receiver contacts being connected to a point on said delay line, and
      (3) conductive fluid means, coupling each of said sender contacts to a plurality of receiver contacts without there being physical contact between said sender and said receiver contacts, for interpolating the angle of incidence of said waves on said receiver means between the discrete angles which would be measured were each of said sender contacts connected to only a single receiver contact.

2. The device defined in claim 1, wherein said receiver means are arranged in a geometric configuration.

3. The device defined in claim 2, wherein said sender contacts are arranged in a geometric configuration conformal to the geometric arrangement of said receiver means.

4. The device defined in claim 1, wherein said switch means is continuously adjustable.

5. The device defined in claim 1, wherein said waves are sound waves propagating in water.

6. The device defined in claim 1, wherein the specific resistance of said fluid is sufficiently high that the resistance between two adjoining contacts fails to appreciably affect the impedance between the points of said delay line to which said contacts are coupled.

7. The device defined in claim 1, wherein at least the portion of said sender and said receiver contacts which is wetted by said fluid is made of a precious metal.

8. The device defined in claim 1, wherein said fluid is an electrolytic solution.

9. The device defined in claim 8, wherein said electrolytic solution includes a mixture of mannite, boric acid and potassium chlorite with a diluting agent.

10. The device defined in claim 9, wherein said diluting agent includes water.

11. The device defined in claim 10, wherein said diluting agent includes alcohol for depressing the freezing point of said solution.

12. The device defined in claim 8 wherein said solution contains an alcohol additive for depressing its freezing point.

13. The device defined in claim 1, wherein said receiver means are arranged in the arc of a circle and said sender and said receiver contacts are arranged on a first and second cylindrical surface, respectively, said first surface being concentric with said second surface.

14. The device defined in claim 1, wherein one of said pluralities of sender contacts and receiver contacts is movable with respect to the other of said pluralities.

15. The device defined in claim 14, wherein said plurality of sender contacts are movable and are connected to respective ones of said receiver means through said conductive fluid.

16. The device defined in claim 14, wherein said plurality of receiver contacts are movable and are connected to said respective points of said delay line through said conductive fluid.

17. The device defined in claim 14, further comprising means connected to the output of said delay line for measuring the strength of the signal at said output.

18. The device defined in claim 17 wherein said plurality of receiver contacts and said delay line are movable and said output of said delay line is connected to said measuring means through said conductive fluid.

19. In apparatus for measuring the direction of propagation of sound waves in water including a geometrically arranged group of receivers for detecting said sound waves and a compensating means for equalizing the differences in transit time of the plane fronts of said waves incident on individual ones of said receivers, said means having a delay line network and a switching network, connecting said group of receivers with said delay line network, which switching network comprises a group of sender switch contacts connected with said receivers and arranged in a plane conformal to said group of receivers, and a group of receiver switch contacts connected to various points of said delay line network and arranged in a plane and adjustable with respect to said group of sender switch contacts such that said receiver contacts interact with said sender contacts at any given switch position so as to provide for compensation of said differences in transit time for a given direction of propagation, the improvement that each of said sender switch contacts is simultaneously coupled with a number of adjoining receiver switch contacts, the degree of coupling being without physical contact between said sender and said receiver switch contacts, the degree of coupling being continuously dependent on the geometric relative position of said sender and said receiver switch contacts, thereby to obtain an interpolative effect.

References Cited

UNITED STATES PATENTS

| | | | |
|---|---|---|---|
| 2,752,584 | 6/1956 | Burke | 340—6 |
| 2,902,673 | 9/1959 | Hare | 340—6 X |
| 3,108,251 | 10/1963 | Corbett | 340—6 X |

RICHARD A. FARLEY, *Primary Examiner.*

U.S. Cl. X.R.

340—16; 343—120